(12) United States Patent
Beekhuizen et al.

(10) Patent No.: US 7,788,056 B2
(45) Date of Patent: Aug. 31, 2010

(54) METHOD OF AUTO-CALIBRATING AIRCRAFT CABIN PRESSURE SENSORS

(75) Inventors: Harold Beekhuizen, Tucson, AZ (US); Tom Whitney, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 98 days.

(21) Appl. No.: 12/234,306

(22) Filed: Sep. 19, 2008

(65) Prior Publication Data

US 2010/0076711 A1 Mar. 25, 2010

(51) Int. Cl.
G01L 27/00 (2006.01)
G06G 7/00 (2006.01)
(52) U.S. Cl. .......................... 702/98; 701/14
(58) Field of Classification Search .................. 702/85, 702/98; 701/14, 120
See application file for complete search history.

(56) References Cited

U.S. PATENT DOCUMENTS

| | | | |
|---|---|---|---|
| 4,812,747 A | 3/1989 | Gale et al. | |
| 5,186,681 A | 2/1993 | Emmons | |
| 5,273,486 A | 12/1993 | Emmons et al. | |
| 5,274,577 A | 12/1993 | Hinrichs | |
| 5,334,090 A | 8/1994 | Rix | |
| 5,508,947 A | 4/1996 | Sierk et al. | |
| 6,370,450 B1 * | 4/2002 | Kromer et al. | 701/14 |
| 7,216,048 B2 | 5/2007 | Wang et al. | |
| 7,462,098 B2 * | 12/2008 | Arthurs et al. | 454/74 |
| 2006/0211359 A1 | 9/2006 | Arthurs et al. | |
| 2007/0102576 A1 | 5/2007 | McCoy et al. | |

* cited by examiner

*Primary Examiner*—Bryan Bui
(74) *Attorney, Agent, or Firm*—Ingrassia Fisher & Lorenz, P.C.

(57) ABSTRACT

A method of auto-calibrating aircraft cabin pressure sensors in a cabin pressure control system while in service, wherein at a constant sensed cabin pressure during a cruise flight phase at least one pressure sensor output voltage from each of two cabin pressure sensors are recorded. Upon landing and opening of the cabin doors the sensed cabin pressure value is compared to an external field pressure. A new software slope variable and a new software offset variable are computed for the pressure/voltage function using an average computed pressure value in cruise and the recorded field atmospheric pressure sensor voltage value on the ground. Thereafter, a new cabin pressure value is calculated and control software is modified.

20 Claims, 3 Drawing Sheets

METHOD OF AUTO-CALIBRATING AIRCRAFT CABIN PRESSURE SENSORS

TECHNICAL FIELD

The present invention relates to aircraft cabin pressure controls and, more particularly, to a method of auto-calibrating aircraft cabin pressure sensors.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin altitude," which refers to the normal atmospheric pressure existing at a certain altitude. Studies have shown that the symptoms of hypoxia may become noticeable when the cabin altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin altitude to minimize passenger discomfort.

A typical cabin pressure control system implements pressure controllers, outflow valves and control logic that may, when needed or desired, begin pressurizing the aircraft cabin (or "descending" the aircraft cabin) before take-off, either while taxiing on or to the runway or at the start of the take-off roll down the runway. The pressure control system may implement pressure transducers, also referred to as pressure sensors, to monitor various pressure conditions internal and external the aircraft cabin. During flight the pressure control system enables the aircraft cabin to remain at the appropriate pressure until landing, when de-pressurization takes place. Typically, the pressure sensor components of the cabin pressure system are initially calibrated when placed into service to primary standards set forth by the National Institute of Standards and Technology (NIST). Oftentimes these sensor components are subject to drift due to age, external environmental factors or influence of other system components. To compensate for the drift, the pressure control system hardware or operational software may be fine tuned at various times during the life of the system. When the drift exhibited by the pressure sensors becomes excessive, the sensor components are typically removed from the aircraft and recalibrated, resulting in down time, expense and loss of revenue.

Hence, there is a need for a method of auto-calibrating a pressure control system, and more particularly the system's pressure sensors, without the need for removal of the pressure sensor components from the aircraft. More particularly, there is a need for a method that enables the drift experienced by the pressure sensor components to be auto-calibrated while the components are in service. The present invention addresses one or more of these needs.

BRIEF SUMMARY

The present invention provides a method of auto-calibrating a cabin pressure sensor, included as a part of a cabin pressure control system.

In one embodiment, and by way of example only, the method includes recording a value for each of at least two sensed cabin pressures and at least two pressure sensor output voltages in at least two associated control circuits when an aircraft is in a level flight status at a cruise altitude; when the aircraft is in ground mode, computing an absolute value of a difference between at least one sensed cabin pressure and a field pressure; determining if the computed absolute value is less than a predetermined value; recording the field pressure and at least one value for at least one pressure sensor output voltage when the aircraft is in the ground mode; computing at least one new slope variable for at least one of the associated control circuits; computing at least one new offset variable for at least one of the associated control circuits; and computing at least one new pressure sensor offset and slope calibration for at least one cabin pressure sensor.

In another exemplary embodiment, the method of auto-calibrating a cabin pressure control system includes recording a value for a sensed cabin pressure ($PC1_{cruise}$ and $PC2_{cruise}$) and a pressure sensor output voltage ($VPC1_{cruise}$ and $VPC2_{cruise}$) in an associated control circuit software for each of the active cabin pressure sensor and the standby cabin pressure sensor when an aircraft is at a cruise altitude; when the aircraft is in ground mode, computing an absolute value of a difference between the sensed cabin pressure and a field pressure (PA) for each of the active cabin pressure sensor and the standby cabin pressure sensor; determining if the computed absolute value for each of the active cabin pressure sensor and the standby cabin pressure sensor is less than a value to be determined based on a specific application tolerance stack analysis; recording a value for a pressure sensor output voltage for each of the active cabin pressure sensor (VPC1) and the standby cabin pressure sensor (VPC2) when the aircraft is in the ground mode; computing an average cruise pressure value ($PC_{cruise\ avg}$) for the sensed cabin pressures at the cruise altitude; computing a new slope variable for the associated control circuit software of each of the active cabin pressure sensor (slope1) and the standby cabin pressure sensor (slope2); computing a new offset variable for the associated control circuit software of each of the active cabin pressure sensor (offset1) and the standby cabin pressure sensor (offset2); and computing a new pressure sensor value for each of the active cabin pressure sensor and the standby cabin pressure sensor.

In yet another exemplary embodiment, the method of auto-calibrating a cabin pressure control system includes recording a value for a sensed cabin pressure ($PC1_{cruise}$ and $PC2_{cruise}$) and a pressure sensor output voltage ($VPC1_{cruise}$ and $VPC2_{cruise}$) in an associated control circuit software for each of the first channel cabin pressure sensor and the second channel cabin pressure sensor when an aircraft is at a cruise altitude; when the aircraft is in ground mode, computing an absolute value of a difference between the sensed cabin pressure and a field pressure (PA) for each of the first channel cabin pressure sensor and the second channel cabin pressure sensor; determining if the computed absolute value for each of the first channel cabin pressure sensor and the second channel cabin pressure sensor is less than a value to be determined based on a specific application tolerance stack analysis; recording a value for a pressure sensor output voltage for each of the first channel cabin pressure sensor (VPC1) and the second channel cabin pressure sensor (VPC2) when the aircraft is in the ground mode; computing an average cruise pressure value ($PC_{cruise\ avg}$) for the sensed cabin pressures at the cruise altitude using an equation, $$PC_{cruise\ avg} = \frac{PC1_{cruise} + PC2_{cruise}}{2}$$

computing a new slope variable for the associated control circuit software of each of the first channel cabin pressure sensor (slope1) and the second channel cabin pressure sensor (slope2) using the equations, $$slope1 = \frac{(PA - PC_{cruise\ avg})}{(VPC1 - VPC1_{cruise})} \text{ and}$$
$$slope2 = \frac{(PA - PC_{cruise\ avg})}{(VPC2 - VPC2_{cruise})};$$

computing a new offset variable for the associated control circuit software of each of the first channel cabin pressure sensor (offset1) and the second channel cabin pressure sensor (offset2) using the equations, offset1=$PA$-($VPC1$*slope1) and offset2=$PA$-($VPC2$*slope2); and computing a new pressure sensor value for each of the first channel cabin pressure sensor and the second channel cabin pressure sensor using the equations, $PC1$=($VPC1$*slope1)+offset1 and $PC2$=($VPC2$*slope2)+offset2.

Other independent features and advantages of the method of auto-calibrating a cabin pressure sensor included as a part of a cabin pressure control system will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figure, wherein.

DETAILED DESCRIPTION

Before proceeding with the description, it is to be appreciated that the following detailed description is merely exemplary in nature and is not intended to limit the invention or the application and uses of the invention. Furthermore, there is no intention to be bound by any theory presented in the preceding background or the following detailed description.

The embodiment disclosed herein is described in sufficient detail to enable those skilled in the art to practice the invention, and it is to be understood that other embodiments may be utilized and that logical, mechanical and electrical changes may be made without departing from the scope of the present invention. Furthermore, it will be understood by one of skilled in the art that although the specific embodiment illustrated below is directed at a method of auto-calibrating a pressure sensor in a pressure control system in an aircraft, for purposes of explanation, the apparatus may be used in various other embodiments employing calibration of pressure sensors. The following detailed description is, therefore, not to be taken in a limiting sense.

Figure 1:
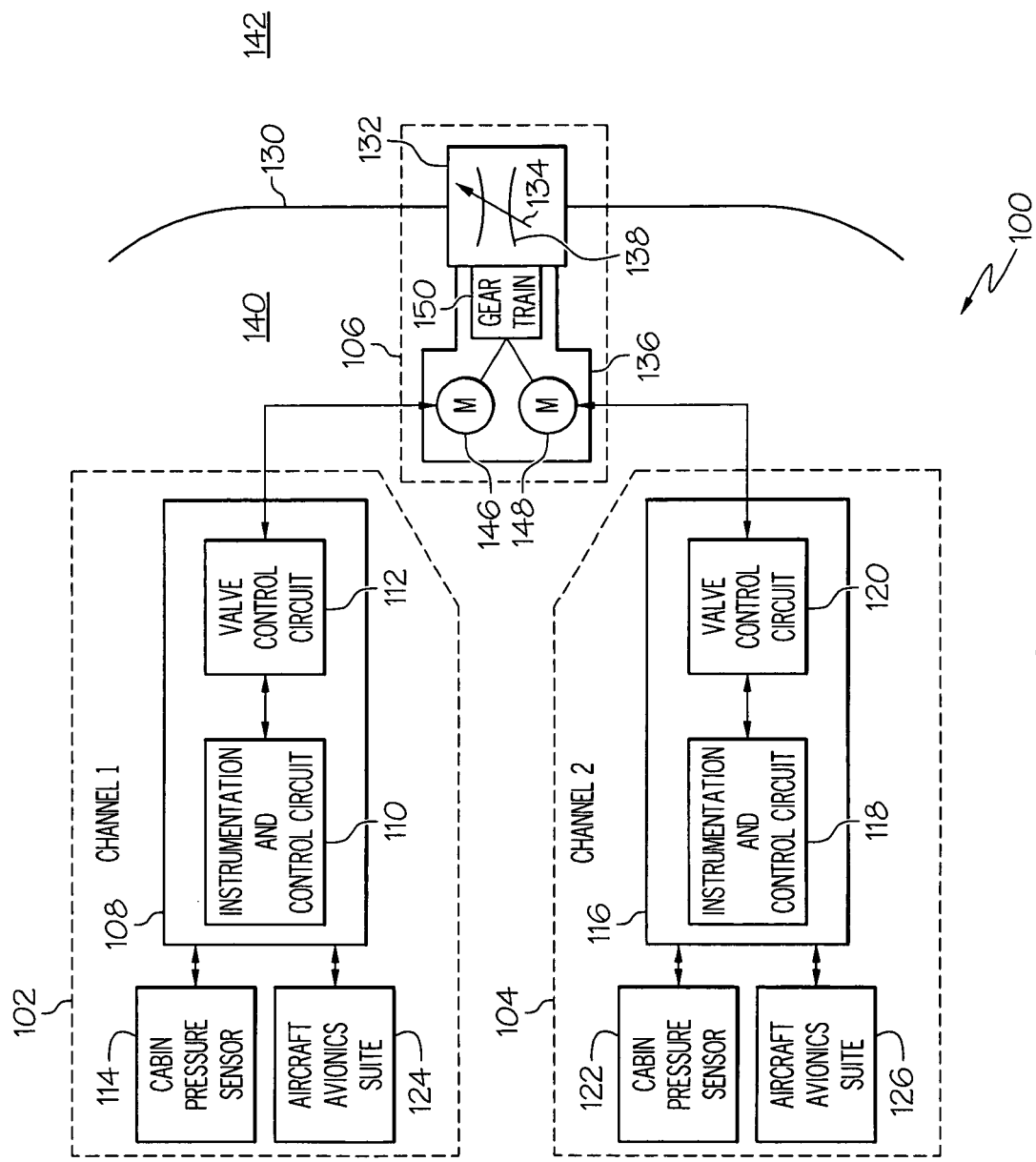
FIG. 1 is a functional block diagram of an aircraft cabin pressure control system according to an embodiment.

The following is a novel method of auto-calibrating the cabin pressure sensors in a dual channel cabin pressure control system of an aircraft while the aircraft is in service. The auto-calibration method recalculates the software's slope and offset variables which are used in the conversion from a pressure sensor output voltage to a calculated cabin pressure for each channel of the system. Turning now to FIG. 1, a functional block diagram of an exemplary dual channel aircraft cabin pressure control system 100, and its interconnections to certain other aircraft systems, is shown. In the depicted embodiment, the system 100 includes redundant first control channel components 102 and second control channel components 104, also referred to herein as an active first control channel and a standby second control channel, coupled to a single outflow valve 106. Although not depicted, it will be appreciated that the system 100 may additionally include one or more overpressure relief valves, and one or more negative pressure relief valves. These valves are typically included as part of an aircraft cabin pressure control system but, for clarity and ease of illustration and depiction, are not shown or further described herein. Moreover, before proceeding further with the description of the system 100, it is noted that the depicted embodiment is merely exemplary and that the system 100 could be implemented with two or more independent outflow valves 106.

The active first control channel 102 of the system 100 includes a control unit 108 comprising an instrumentation and control circuit 110 and a valve control circuit 112. The instrumentation and control circuit 110 is coupled to receive signals from a plurality of sensors and other signal sources. In the depicted embodiment, the illustrated sensor included as a part of the active or first control channel 102 is an active channel or first cabin pressure sensor 114. The standby or second control channel 104 of the system 100 includes a control unit 116 that, similar to the first control channel control unit 108, includes an instrumentation and control circuit 118 and a valve control circuit 120. The instrumentation and control circuit 118 is coupled to receive signals from a standby channel or second cabin pressure sensor 122. It will be appreciated that the cabin pressure sensors 114 and 122 depicted and described herein are merely exemplary, and that the system 100 could be implemented with additional or different types of sensors. For example, each channel of the system 100 could additionally include additional cabin temperature sensors, one or more atmosphere pressure sensors and/or one or more cabin-to-atmosphere differential pressure sensors.

The first and second cabin pressure sensors 114 and 122 are disposed and configured to sense absolute cabin pressure, and are preferably implemented as any one of numerous types of analog pressure sensors. Some non-limiting examples of suitable analog pressure sensors include various semiconductor diaphragm pressure sensors, various capacitance pressure sensors, various optical sensors, and various magnetic sensors. In a particular preferred embodiment, however, the first and second cabin pressure sensors 114 and 122 are implemented as piezoelectric strain gauge sensors.

In an embodiment including one or more cabin temperature sensors, the sensors would be disposed and configured to sense cabin temperature, and preferably implemented as any one of numerous types of analog temperature sensors. Some non-limiting examples of suitable temperature sensors include resistance temperature detectors (RTDs), thermocouples, and various types of optical temperature sensors. When included, the cabin temperature sensors are used to correct the absolute pressure value sensed by the first and second cabin pressure sensors 114 and 122 for environmental temperature changes.

Each of the instrumentation and control circuits 110 and 118 are configured to communicate with, and receive signals from, an associated aircraft avionics suite 124 and 126, respectively, via, for example, aircraft interface data buss(es), analog, and/or discrete input/output signals. Based on the signals received from the avionics suites 124 and 126, as well as signals supplied from the first and second cabin pressure sensors 114 and 122, the associated instrumentation and control circuit 110 or 118 computes a desired (or commanded) cabin pressure command, an actual (or sensed) cabin pressure, a desired (or commanded) cabin pressure rate-of-change, an actual (or sensed) cabin pressure rate-of-change, temperature corrected cabin pressure, supplies appropriate actuation control signals to the associated valve control circuits 112 or 120, respectively, and additionally supplies various alarm, indication, warning, and/or control signals.

Each of the valve control circuits 112 and 120 receives the actuation control signals supplied from their associated instrumentation and control circuit 110 and 118, respectively. In response to the actuation control signals, which preferably include speed or duty cycle command information and direction information, the valve control circuits 112 and 120 supply valve command signals to the outflow valve 106, to thereby control the position of the outflow valve 106, and thereby modulate cabin pressure.

The outflow valve 106 is preferably mounted on an aircraft bulkhead 130, and includes a valve body 132, a valve element 134, and a valve actuator 136. The valve body 132 has a flow passage 138 that extends through it, such that when the outflow valve 106 is mounted on the aircraft bulkhead 130, the flow passage 138 is in fluid communication with the aircraft cabin 140 and the external atmosphere 142. The valve element 134 is movably mounted on the valve body 132 and extends into the flow passage 138. The valve element 134 is movable between an open position, in which the aircraft cabin 140 and the external atmosphere 144 are in fluid communication, and a closed position, in which the aircraft cabin 140 is sealed from the external atmosphere.

The valve actuator 136 is coupled to the valve element 134 and positions the valve element 134 to a commanded position, to thereby control cabin pressure. To do so, the valve actuator 136 is coupled to receive the valve command signals supplied by the valve control circuits 112 and 120. In response to the supplied valve command signals, the valve actuator 136 moves the valve element 134 to the commanded position. It will be appreciated that the valve actuator 136 may be implemented as any one of numerous types of actuators, but in the depicted embodiment the valve actuator 136 is implemented with a first motor 146 coupled to the first control channel control unit 108, a second motor 148 coupled to the second control channel control circuit 116, and a suitable gear train 150.

Each of the instrumentation and control circuits 110 and 118 are coupled to receive one or more signals supplied from their respective avionics suite 124 and 126, and their respective cabin pressure sensor 114 and 122. The signals from the avionics suites 124 and 126 and the first and second cabin pressure sensors 114 and 122 are representative of the operational mode of the aircraft. In response to the received signals, the respective control units 108 recalculate software variables to auto-calibrate the first and second cabin pressure sensors 114 and 122 according to a method illustrated in FIG. 2.

Figure 2:
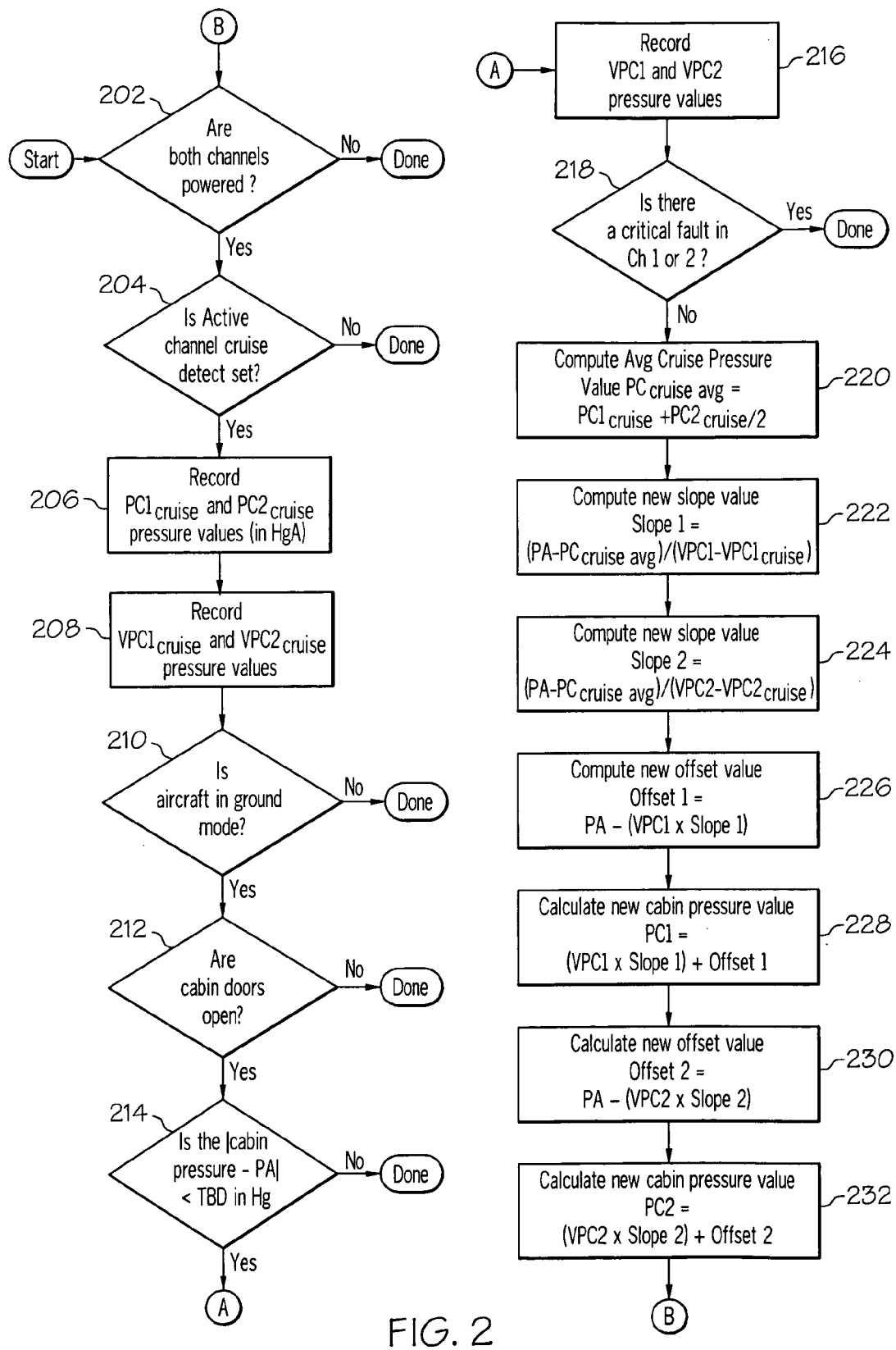
FIG. 2 is a flow chart detailing a method of auto-calibrating pressure sensors of an aircraft cabin pressure control system according to an embodiment.

Turning now to FIG. 2, illustrated is a flow chart detailing a method 200 for auto-calibrating the first (active) and second (standby) cabin pressure sensors 114 and 122 of FIG. 1. To enable auto-calibration, data is received on a per flight basis, resulting in offset adjustments to the first and second cabin pressure sensors 114 and 122. More specifically, detailed is the method 200 for recalculating software variables, referred to herein as slope and offset, which are used in the conversion of a pressure sensor output voltage to a calculated cabin pressure for each channel, thereby enabling auto-calibration of the first and second cabin pressure sensors 114 and 122.

As previously stated, the first and second cabin pressure sensor 114 and 122 are auto-calibrated on a per flight basis. To begin the process of auto-calibration, the instrumentation and control circuit 110 of the first control channel 102, hereinafter referred to as the active control channel, and instrumentation and control circuit 118 of the second control channel 104, hereinafter referred to as the standby control channel, determine if the active control channel 102 and the standby control channel 104 of the system 100 are operational during a sequence of flight as best illustrated at 202. At a specific point in flight, an active control channel cruise detect flag is set 204, indicating that the aircraft altitude has not changed within a 1000 feet window for greater than 1 minute. When this prerequisite has been met, the first cabin pressure sensor 114 submits a signal to the instrumentation and control circuit 110 of a sensed pressure value of the active control channel cabin pressure ($PC1_{cruise}$) and the second cabin pressure sensor 122 submits a signal to the instrumentation and control circuit 118 of a sensed pressure value of the standby control channel cabin pressure ($PC2_{cruise}$). The $PC1_{cruise}$ and the $PC2_{cruise}$ are simultaneously recorded 206 by control software in the each of the associated instrumentation and control circuits 110 and 118. In addition, values for an active control channel pressure sensor output voltage ($VPC1_{cruise}$) and a standby control channel pressure sensor output voltage ($VPC2_{cruise}$) are recorded 208 by the control software.

After the aircraft has landed 210 and the cabin doors are opened 212, also referred to as the aircraft being in ground mode, each instrumentation and control circuit 110 and 118, and more particularly the associated control software, determines if the absolute value difference between a sensed cabin pressure value at ground and a field pressure (PA) is less than a predetermined value, which is determined based on specific application tolerance stack analysis 214. The field pressure (PA) may be obtained for each channel from the aircraft avionics suites 124 and 126, via air data computer information on aircraft interface data buss(es). If the calculated absolute values meet with these criteria, then further calculations resulting in auto-calibration of each of the first and second cabin pressure sensors 114 and 122 are continued.

Subsequent to the step of calculating the absolute value differences 214, values for an active control channel pressure sensor output voltage at ground (VPC1) and a standby control channel pressure sensor output voltage at ground (VPC2) are recorded 216 by the control software while the aircraft is in ground mode. Next, the control software determines whether a critical fault 218 exists with regard to the active or first control channel control unit 108 and associated cabin pressure sensor 114 and the standby or second control channel control unit 116 and associated cabin pressure sensor 122. If no critical faults are detected, a value for the average cabin pressure at cruise altitude ($PC_{cruise\ avg}$) is calculated 220 according to the following formula:

$$PC_{cruise\ avg} = \frac{PC1_{cruise} + PC2_{cruise}}{2}.$$

If additional accurate cabin pressure sensor readings are available to both the active control channel 102 and the standby control channel 104, they may be included in calculating the value of $PC_{cruise\ avg}$.

A new slope value used by the control software for the first cabin pressure sensor 114 (FIG. 1) is next calculated 222 using the following equation:

$$slope1 = \frac{(PA - PC_{cruise\ avg})}{(VPC1 - VPC1_{cruise})}.$$

The new value of slope1 is limited to be within a $slope_{min}$ and a $slope_{max}$, wherein $slope_{min}$ is the minimum allowable software value of slope and slopemax is the maximum allowable software value of slope, which result in a pressure calculation from sea level to 8,000 ft, a value within acceptable limits, such as Acceptance Test Procedure (ATP) limits as set forth by Honeywell International Inc.

A new slope value used by the control software for the second cabin pressure sensor 122 (FIG. 1) is next calculated 224 using the following equation:

$$slope2 = \frac{(PA - PC_{cruise\ avg})}{(VPC2 - VPC2_{cruise})}.$$

The new value of slope2 is limited to be within a $slope_{min}$ and a $slope_{max}$ as stated previously with regard to the value of slope 1.

To complete the auto-calibration of the first cabin pressure sensor 114 the current calculated value of PC1 is modified such that it equals the value of PA by recalculating the offset pressure 226, via the software variable offset1 using the following equation:

offset1=$PA$−($VPC1$*slope1).

To complete the auto-calibration of the second cabin pressure sensor 122 the current calculated value of PC2 is modified such that it equals the value of PA by recalculating the offset pressure 230, via the software variable offset1 using the following equation:

offset2=$PA$−($VPC2$*slope2).

The new calculated values 228 and 232 for PC1 and PC2 are:

PC1=($VPC1$*slope1)+offset1

PC2=($VPC2$*slope2)+offset2

In response to these calculated values for the first and second cabin pressure sensors 114 and 122, software used by the instrumentation and control circuit 110 for the first cabin pressure sensor 114 and the software used by the instrumentation and control circuit 118 for the second cabin pressure sensor 122 are automatically adjusted for the offset values, or recalibrated, prior to and for use in the next flight sequence. The method 200 is repeated when the aircraft is again in a cruise portion of a flight. Accordingly, the first cabin pressure sensor 114 and the second cabin pressure sensor 122 are continually being auto-calibrated every flight via software adjustments, thereby minimizing any need for removal of the sensors for manual recalibration.

Figure 3:
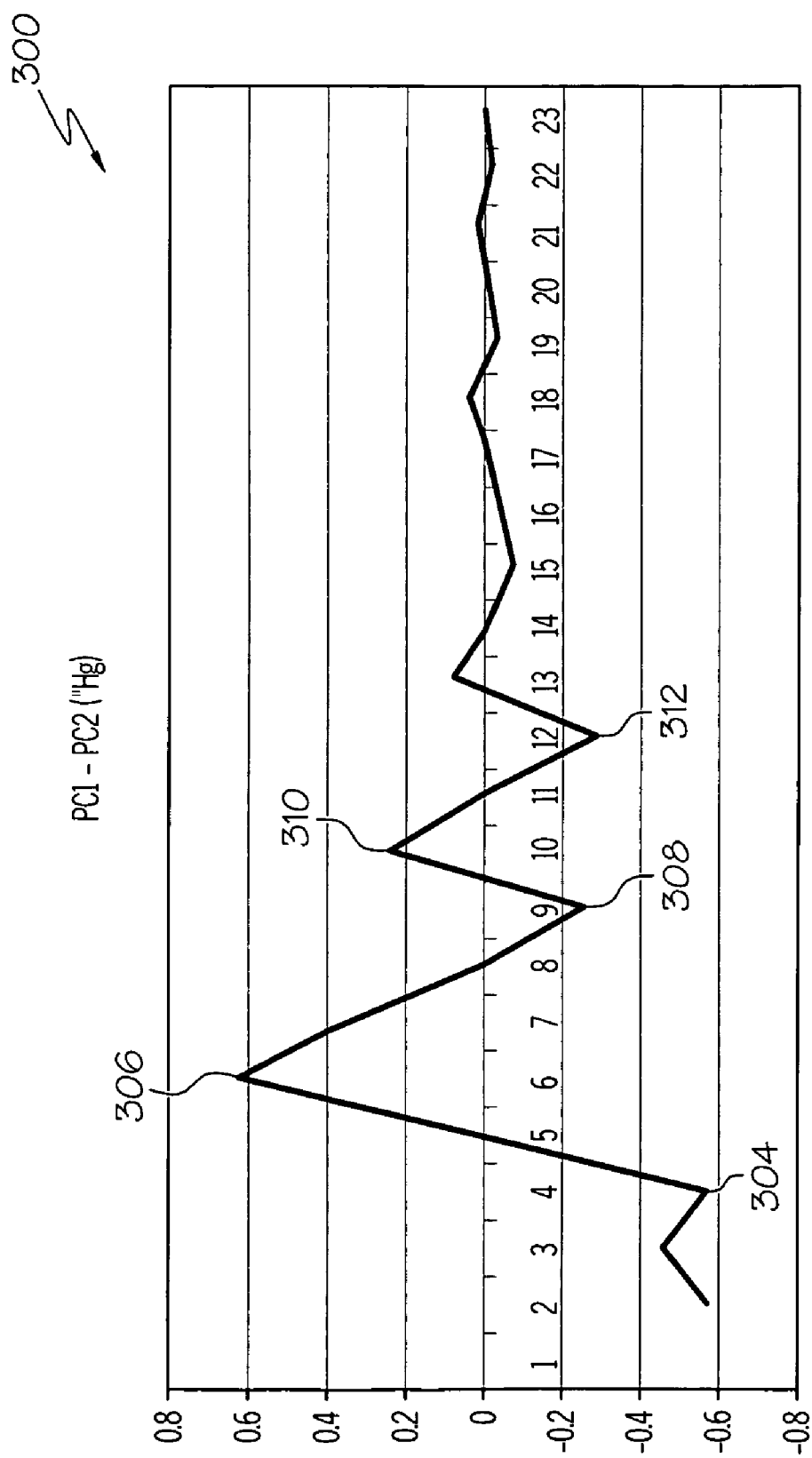
FIG. 3 illustrates a graph and supporting data detailing a system that implements an embodiment of the auto-calibration method of the instant invention.

In support of this method of auto-calibration, reference should now be made to FIG. 3, which depicts a graphical representation 300 of supporting data for auto-calibration of a first (active channel) cabin pressure sensor (PC1), similar to the first cabin pressure sensor 114 of FIG. 1 and a second (standby channel) cabin pressure sensor (PC2), similar to the second cabin pressure sensor 122 of FIG. 2. Referring more specifically to the graphical representation 300, the y-axis shows the difference in pressure readings between the two cabin pressure sensors (PC1 and PC2) in units of inches of mercury. In light of both pressure sensors (PC1 and PC2) measuring the same cabin pressure, the difference is due to a calibration error between them. The x-axis corresponds to each step in the method. More specifically, a point 304 represents initial conditions on the ground, a point 306 represents a recording of PC1 and PC2 at a cruise altitude, a point 308 represents ground mode and a low cabin to atmospheric differential pressure on ground, a point 310 represents calculations to obtain a new slope variable and offset variable on ground (where the offset is zeroed out and the slope is recalculated), a point 312 represents a recording of PC1 and PC2 at a cruise altitude of the next flight. The remaining data points represent a continuation of the method throughout six flight occurrences. As can be seen in the graph 300, even though a large calibration error between the two cabin pressure sensors (PC1 and PC2) is initially present, represented at point 304, after six (6) flights the error is significantly reduced to well within an acceptable range (approx 20 sea level feet).

Accordingly, disclosed is a method for auto-calibrating aircraft cabin pressure sensors that minimizes the need for removal of the sensors from the aircraft for manual recalibration. The disclosed method enables the drift experienced by the cabin pressure control system, and more specifically the pressure sensors, to be auto-calibrated while the components are in service.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of auto-calibrating aircraft cabin pressure sensors, comprising the steps of:

recording a value for each of at least two sensed cabin pressures and at least two pressure sensor output voltages in at least two associated control circuits when an aircraft is in a level flight status at a cruise altitude;

when the aircraft is in ground mode, computing an absolute value of a difference between at least one sensed cabin pressure and a field pressure;

determining if the computed absolute value is less than a predetermined value;

recording the field pressure and at least one value for at least one pressure sensor output voltage when the aircraft is in the ground mode;

computing at least one new slope variable for at least one of the associated control circuits;

computing at least one new offset variable for at least one of the associated control circuits; and computing at least one new pressure sensor offset and slope calibration for at least one cabin pressure sensor.

2. The method of claim 1, further including a first cabin pressure sensor coupled to a first active channel control circuit and a second cabin pressure sensor coupled to a second standby channel control circuit.

3. The method of claim 2, further comprising:

recording a value ($PC1_{cruise}$) for a sensed cabin pressure from the first cabin pressure sensor and recording a value ($PC2_{cruise}$) for a sensed cabin pressure from the second cabin pressure sensor.

4. The method of claim 3, further comprising:

recording a value ($VPC1_{cruise}$) for a pressure sensor output voltage of the first cabin pressure sensor and recording a value ($VPC2_{cruise}$) for a pressure sensor output voltage of the second cabin pressure sensor.

5. The method of claim 4, further comprising:

computing an absolute value for the sensed cabin pressure from the first cabin pressure sensor minus the field pressure (PA) and computing an absolute value for the sensed cabin pressure from the second cabin pressure sensor minus the field pressure.

6. The method of claim 5, further comprising:

recording a value (VPC1) for a pressure sensor output voltage for the first cabin pressure sensor and recording a value (VPC2) for a pressure sensor output voltage for the second cabin pressure sensor when the aircraft is in the ground mode.

7. The method of claim 6, further comprising:

computing an average cruise pressure value ($PC_{cruise\ avg}$) for the sensed cabin pressures at the cruise altitude using the following equation:

$$PC_{cruise\ avg} = \frac{PC1_{cruise} + PC2_{cruise}}{2}.$$

8. The method of claim 7, further comprising:

computing a new slope variable (slope1) for the associated control circuit software of the first cabin pressure sensor and computing a new slope variable (slope 2) for the associated control circuit software of the second cabin pressure sensor.

9. The method of claim 8, wherein the associated control circuit software computes the new slope variable for the first cabin pressure sensor using the following equation:

$$slope1 = \frac{(PA - PC_{cruise\ avg})}{(VPC1 - VPC1_{cruise})}.$$

and the associated control circuit software computes the new slope variable for the second cabin pressure sensor using the following equation:

$$slope2 = \frac{(PA - PC_{cruise\ avg})}{(VPC2 - VPC2_{cruise})}.$$

10. The method of claim 9, further comprising:

computing a new offset variable (offset 1) for the associated control circuit software of the first cabin pressure sensor and computing a new offset variable (offset 2) for the associated control circuit software of the second cabin pressure sensor.

11. The method of claim 10, wherein the associated control circuit software computes offset 1 using the following equation:

$$offset1 = PA - (VPC1 * slope1)$$

and the associated control circuit software computes offset 2 using the following equation:

$$offset2 = PA - (VPC2 * slope2).$$

12. The method of claim 11, further comprising:

computing a new pressure sensor value (PC1) for the associated control circuit software of the first cabin pressure sensor and computing a new pressure sensor value (PC2) for the associated control circuit software of the second cabin pressure sensor.

13. The method of claim 12, wherein the associated control circuit software computes PC1 using the following equation:

$$PC1 = (VPC1 * slope1) + offset1$$

and the associated control circuit software computes PC2 using the following equation:

$$PC2 = (VPC2 * slope2) + offset2.$$

14. A method of auto-calibrating an active channel cabin pressure sensor and standby channel cabin pressure sensor in an aircraft cabin pressure control system, comprising the steps of:

recording a value for a sensed cabin pressure ($PC1_{cruise}$ and $PC2_{cruise}$) and a pressure sensor output voltage ($VPC1_{cruise}$ and $VPC2_{cruise}$) in an associated control circuit software for each of the active cabin pressure sensor and the standby cabin pressure sensor when an aircraft is at a cruise altitude;

when the aircraft is in ground mode, computing an absolute value of a difference between the sensed cabin pressure and a field pressure (PA) for each of the active cabin pressure sensor and the standby cabin pressure sensor;

determining if the computed absolute value for each of the active cabin pressure sensor and the standby cabin pressure sensor is less than a value to be determined based on a specific application tolerance stack analysis;

recording a value for a pressure sensor output voltage for each of the active cabin pressure sensor (VPC1) and the standby cabin pressure sensor (VPC2) when the aircraft is in the ground mode;

computing an average cruise pressure value ($PC_{cruise\ avg}$) for the sensed cabin pressures at the cruise altitude;

computing a new slope variable for the associated control circuit software of each of the active cabin pressure sensor (slope1) and the standby cabin pressure sensor (slope2);

computing a new offset variable for the associated control circuit software of each of the active cabin pressure sensor (offset1) and the standby cabin pressure sensor (offset2); and computing a new pressure sensor value for each of the active cabin pressure sensor and the standby cabin pressure sensor.

15. The method of claim 14, further including an active channel control circuit coupled to the active cabin pressure sensor and a standby channel control circuit coupled to the standby cabin pressure sensor.

16. The method of claim 15, wherein the associated control circuit software computes the average cruise pressure value ($PC_{cruise\ avg}$) for the sensed cabin pressures at the cruise altitude using the following equation:

$$PC_{cruise\ avg} = \frac{PC1_{cruise} + PC2_{cruise}}{2}.$$

17. The method of claim 16, wherein the associated control circuit software computes the new slope variable for the active cabin pressure sensor using the following equation:

$$slope1 = \frac{(PA - PC_{cruise\ avg})}{(VPC1 - VPC1_{cruise})}$$

and the associated control circuit software computes the new slope variable for the standby cabin pressure sensor using the following equation:

$$slope2 = \frac{(PA - PC_{cruise\ avg})}{(VPC2 - VPC2_{cruise})}.$$

18. The method of claim 17, wherein the associated control circuit software computes an offset 1 value using the following equation:

offset1=$PA-(VPC1*slope1)$ and the associated control circuit software computes an offset 2 value using the following equation:

offset2=$PA-(VPC2*slope2)$

19. The method of claim 18, wherein the associated control circuit software computes PC1 using the following equation:

$PC1=(VPC1*slope1)+offset1$ and the associated control circuit software computes PC2 using the following equation:

$PC2=(VPC2*slope2)+offset2.$

20. A method of auto-calibrating aircraft a first channel cabin pressure sensor and a second channel cabin pressure sensor, comprising the steps of:

recording a value for a sensed cabin pressure ($PC1_{cruise}$ and $PC2_{cruise}$) and a pressure sensor output voltage ($VPC1_{cruise}$ and $VPC2_{cruise}$) in an associated control circuit software for each of the first channel cabin pressure sensor and the second channel cabin pressure sensor when an aircraft is at a cruise altitude;

when the aircraft is in ground mode, computing an absolute value of a difference between the sensed cabin pressure and a field pressure (PA) for each of the first channel cabin pressure sensor and the second channel cabin pressure sensor;

determining if the computed absolute value for each of the first channel cabin pressure sensor and the second channel cabin pressure sensor is less than a value to be determined based on a specific application tolerance stack analysis;

recording a value for a pressure sensor output voltage for each of the first channel cabin pressure sensor (VPC1) and the second channel cabin pressure sensor (VPC2) when the aircraft is in the ground mode;

computing an average cruise pressure value ($PC_{cruise\ avg}$) for the sensed cabin pressures at the cruise altitude using an equation, $$PC_{cruise\ avg} = \frac{PC1_{cruise} + PC2_{cruise}}{2}$$

computing a new slope variable for the associated control circuit software of each of the first channel cabin pressure sensor (slope1) and the second channel cabin pressure sensor (slope2) using the equations, $$slope1 = \frac{(PA - PC_{cruise\ avg})}{(VPC1 - VPC1_{cruise})} \text{ and}$$

$$slope2 = \frac{(PA - PC_{cruise\ avg})}{(VPC2 - VPC2_{cruise})};$$

computing a new offset variable for the associated control circuit software of each of the first channel cabin pressure sensor (offset1) and the second channel cabin pressure sensor (offset2) using the equations, offset1=$PA-(VPC1*slope1)$ and offset2=$PA-(VPC2*slope2)$; and computing a new pressure sensor value for each of the first channel cabin pressure sensor and the second channel cabin pressure sensor using the equations, $PC1=(VPC1*slope1)+offset1$ and $PC2=(VPC2*slope2)+offset2.$

* * * * *